(12) United States Patent
Wall et al.

(10) Patent No.: US 10,830,668 B2
(45) Date of Patent: Nov. 10, 2020

(54) ENGINE VIBRATION IMAGER

(71) Applicant: Southwest Research Institute, San Antonio, TX (US)

(72) Inventors: Craig M. Wall, San Antonio, TX (US); Peter M. Lee, Fair Oaks Ranch, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 279 days.

(21) Appl. No.: 15/589,231

(22) Filed: May 8, 2017

(65) Prior Publication Data

US 2018/0321112 A1     Nov. 8, 2018

(51) Int. Cl.
*G01M 15/12*     (2006.01)
*G01H 1/00*     (2006.01)

(52) U.S. Cl.
CPC ............ *G01M 15/12* (2013.01); *G01H 1/003* (2013.01)

(58) Field of Classification Search
CPC ............................... G01M 15/12; G01H 1/003
USPC .................................................... 73/653, 593
See application file for complete search history.

(56) References Cited

U.S. PATENT DOCUMENTS

| | | | | |
|---|---|---|---|---|
| 4,152,589 A | * | 5/1979 | Mitchell | G01P 3/486 |
| | | | | 250/231.16 |
| 4,266,427 A | * | 5/1981 | Wesley | F02P 7/061 |
| | | | | 73/114.28 |
| 4,643,023 A | * | 2/1987 | Capps | G01M 15/12 |
| | | | | 73/114.07 |
| 5,428,992 A | * | 7/1995 | Wolfe | G01M 15/06 |
| | | | | 324/164 |
| 2004/0113058 A1 | * | 6/2004 | Sonoki | G01D 5/34715 |
| | | | | 250/231.14 |
| 2006/0106523 A1 | * | 5/2006 | Ancimer | G01L 23/225 |
| | | | | 701/111 |
| 2009/0030593 A1 | * | 1/2009 | Chauvin | G01M 15/12 |
| | | | | 701/111 |

(Continued)

OTHER PUBLICATIONS

T.Tian; "Dynamic Behaviours of Piston Rings and Their Practical Impact. Part 1: Ring Flutter and Ring Collapse and Their Effects on Gas Flow and Oil Transport"; Proc Instn Mech Engrs vol. 216, Part J: J Engineering Tribology, pp. 209-227.

(Continued)

*Primary Examiner* — Nimeshkumar D Patel
*Assistant Examiner* — Nashmiya S Fayyaz
(74) *Attorney, Agent, or Firm* — Grossman Tucker Perreault & Pfleger PLLC

(57) ABSTRACT

An engine vibration imager and method of testing engine stability. An accelerometer, mounted to an engine block, is configured to detect engine vibration and generate a signal indicative of detected vibration. An amplifier, electrically coupled to the accelerometer, is configured to amplify the signal indicative of detected vibration. A light indicator, electrically coupled to the amplifier, is configured to emit light upon receiving the amplified signal. The engine vibration imager also includes an indicator disk including timing marks on a first surface of the indicator disk. The indicator disk is rotatable by the crankshaft and light emitted from the light indicator is visible at the first surface of the indicator disk and indicates on the indicator disk a point in the combustion cycle in which engine vibration is detected.

25 Claims, 7 Drawing Sheets

(56) References Cited

U.S. PATENT DOCUMENTS

2015/0192456 A1* 7/2015 Deverell ............ G05B 23/0224
                                                        702/56
2017/0211538 A1* 7/2017 Duan ........................ F02P 5/15

OTHER PUBLICATIONS

C. Wall; "Detecting Piston Ring Instability with Engine Vibration Analysis, 08-R8342" <<http://www.swri.org/3pubs/IRD2014/snopses/088342.htm>> (2 pgs.) accessed Nov. 4, 2015.
Measuring Vibration; Bruel & Kjaer; Revision Sep. 1982 <<https://www.bksv.com/media/doc/br0094.pdf>> (42 pgs) accessed Nov. 4, 2015.

* cited by examiner

ENGINE VIBRATION IMAGER

FIELD

The present disclosure relates to an engine vibration imager and, in particular embodiments, an apparatus for the display of mechanical vibrations by operating cycle phase.

BACKGROUND

Automobile manufacturers and component makers have been engineering automotive components to achieve the gradually increasing Corporate Average Fuel Economy (CAFE) standards, which target an average fleet fuel consumption of 34.1 MPG by 2016 and 56.2 MPG by 2025. One design initiative to achieve CAFE standards is the reduction in the coefficient of friction of moving parts. In addition to achieving CAFE standards, a reduction in the coefficient of friction may also reduce wear and improve reliability of moving components.

One such moving part is the piston ring. One or more piston rings are commonly provided in grooved tracks around the outer perimeter of an engine piston. Where multiple rings are present, the rings may be designed to perform different or overlapping functions. For example, piston rings may be designed to seal the combustion chamber to trap combustion gasses, improving engine efficiency. Piston rings may also be designed to aid in heat transfer and manage engine oil in the cylinder.

One aspect of piston ring performance includes piston ring instability, caused by twisting or binding of the piston ring as the piston reciprocates during the engine cycle. Piston ring instability may be caused, for example, by the interaction of the piston ring with the surrounding cylinder, combustion gas blow-by, and oil slipping past the piston rings and into the combustion chamber. Such instability may cause engine vibration, which may be relatively more prevalent in particular engine operating states. In the past, engine vibrations were predicted but not necessarily directly demonstrated or displayed in real time. Accordingly, it is desirable to develop a visual display of engine vibration and engine stability in relation to crankshaft angle as vibration occurs in real time.

SUMMARY

An aspect of the present disclosure relates to an engine vibration imager. The engine vibration imager includes an accelerometer, which is preferably affixed to an engine block. The accelerometer is preferably configured to detect engine vibration and generate a signal indicative of detected vibration. The engine vibration imager also includes an amplifier electrically coupled to the accelerometer. The amplifier is preferably configured to amplify the signal indicative of detected vibration. In addition, the engine vibration imager includes a light indicator electrically coupled to the amplifier. Preferably, the light indicator is configured to emit light upon receiving the amplified signal indicative of detected vibration. Further, the engine vibration imager includes an indicator disk including timing marks on a first surface of the indicator disk. Light emitted from the light indicator is visible at the timing mark.

Yet another aspect of the present disclosure relates to a method of testing engine stability. The method includes operating an engine at a speed and a load, wherein the engine includes an engine block and a rotating crankshaft. The method further includes detecting engine vibration with an accelerometer mounted to the engine block, wherein the accelerometer generates a signal indicative of detected acceleration. The method also includes amplifying the signal indicative of acceleration with an amplifier electrically coupled to the accelerometer to provide an amplified signal. In addition, the method includes rotating an indicator disk with the crankshaft, wherein the indicator disk includes a timing mark. The method further includes emitting light from a light indicator electrically coupled to the amplifier upon receiving the amplified signal and illuminating the timing mark with the emitted light.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

The present disclosure is directed to an engine vibration imager. The vibration imager allows for the display of mechanical vibrations in relation to the operating cycle phase, i.e., a crankshaft angle or a point in the combustion cycle. The device includes an accelerometer, which is mounted to the engine block. When vibration is detected by the accelerometer, a light indicator coupled to the accelerometer illuminates a timing mark on an indicator disk driven by the crankshaft. The location of the illuminated timing mark relative to a reference point indicates the point in the combustion cycle where the vibration is detected. In particular, the engine vibration imager provides for the measurement of piston ring instability in real-time allowing for verification of predicted ring instability events. However, other vibration events may be detected as well.

Vibration is understood herein as an oscillation of the engine around a fixed point over a period of time. As understood, vibration exhibits a displacement from a reference point (measured as distance), a velocity or rate of displacement from the reference point (measured as distance/time), and an acceleration or rate of the change in the velocity (measured as distance/time$^2$). As noted above, engine vibration may be caused by any number of events, including the closing of valves, piston ring instability, misfiring of spark plugs, air flow/vacuum problems, or mechanical instability such as the piston ring instability noted above.

Figure 1:
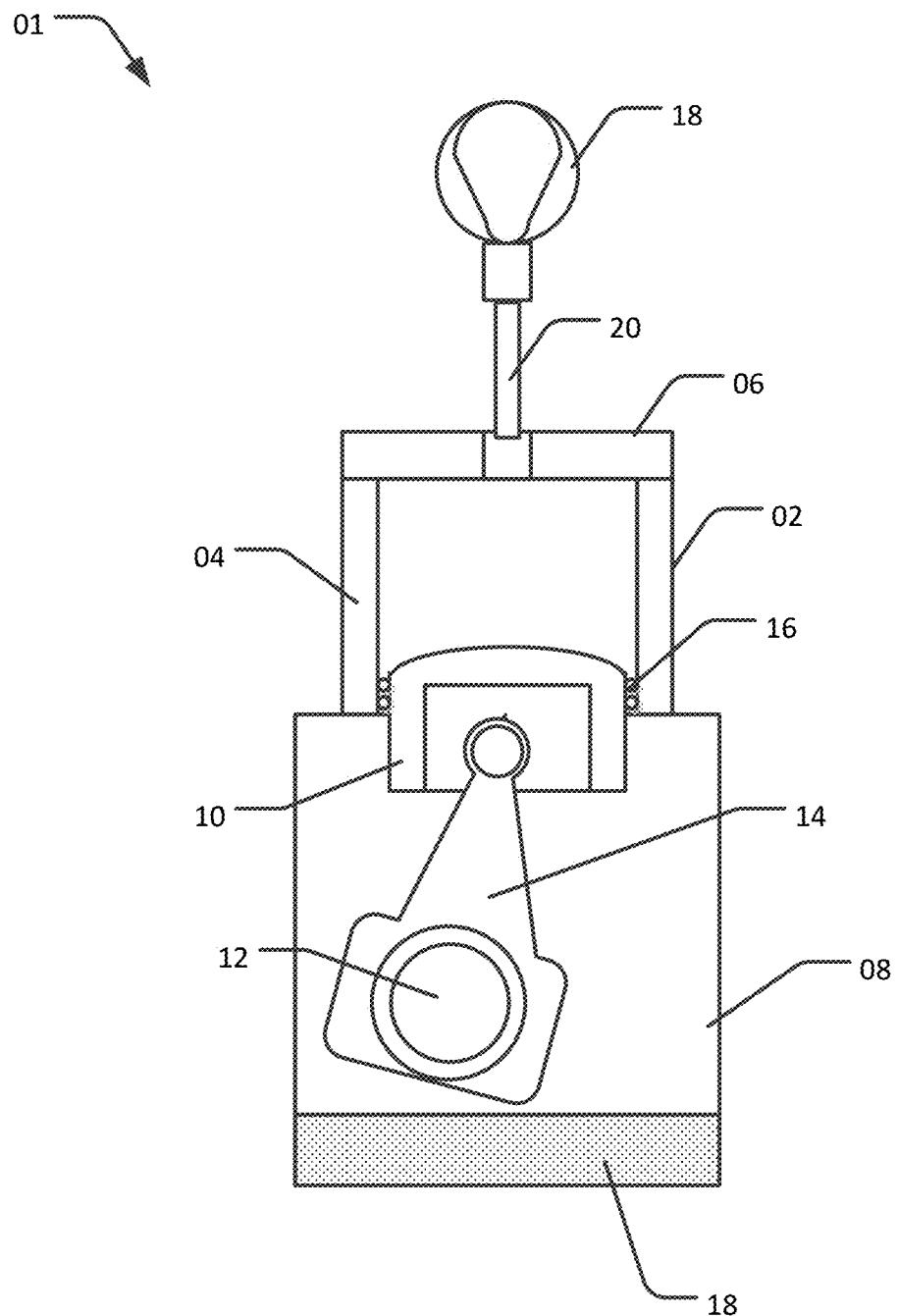
FIG. 1 illustrates a cross-sectional schematic of an embodiment of an engine on which an engine vibration image may be mounted.

FIG. 1 illustrates a schematic cross-section of an embodiment of an engine that the engine vibration imager may be used with. The engine 01 generally includes an engine block 02, which may be provided by a cylinder block 04 including at least one compression cylinder, a cylinder head 06, and a crankshaft case 08. Within each cylinder is positioned a piston 10 that reciprocates up and down in the cylinder. The pistons 10 are connected to a crankshaft 12 by a connector rod 14. The reciprocation of the pistons 10 rotate the crankshaft 12, which is carried by the engine block. Lubricating fluid 18, such as motor oil, may be located within the crankshaft case to lubricate the crankshaft. Piston rings 16 are mounted on the pistons 10 between the pistons 10 and the cylinder 04. The crankshaft 12 drives a camshaft 18, which in turn acts on the intake and exhaust valves 20 associated with the cylinder 04.

To test engine stability and performance, components that are to be examined during engine testing, are placed into the engine. The engine may include piston engines, as illustrated, such as two stroke, four stroke in line or opposing engines, or rotary engines, or may include Wankel rotary engines. In piston engine designs, any number of compression cylinders may be present. Components that may affect engine stability include piston rings, fuel injectors, valves, crankshafts, crankshaft or journal bearings, main bearings, small end bearings, piston heads, connecting rods, etc. The engines may operate with a variety of fuels including one or more of diesel, gas, liquid natural gas, propane, hydrogen, ethanol, methane, methanol, biodiesel, hydrogenated vegetable oil, etc. Further, motor oil may be examined and is considered herein a component of the engine that may be examined using the engine stability tests, as is the fuel used to run the engine. Of particular interest, however, are the piston rings.

The engine may be operated at various speeds and loads as these factors may also affect engine vibration. There are points in the engine cycle where it is understood that vibrations will be observed, such as when the exhaust valves close or when the inlet valves close. However, as engine speeds and loads vary, vibrations may appear at other points during the combustion cycle. For example, piston ring instability may be seen to appear and disappear as vibrations near top dead center indicating binding or rolling of the piston rings as the piston reaches and retracts from top dead center.

Figure 2:
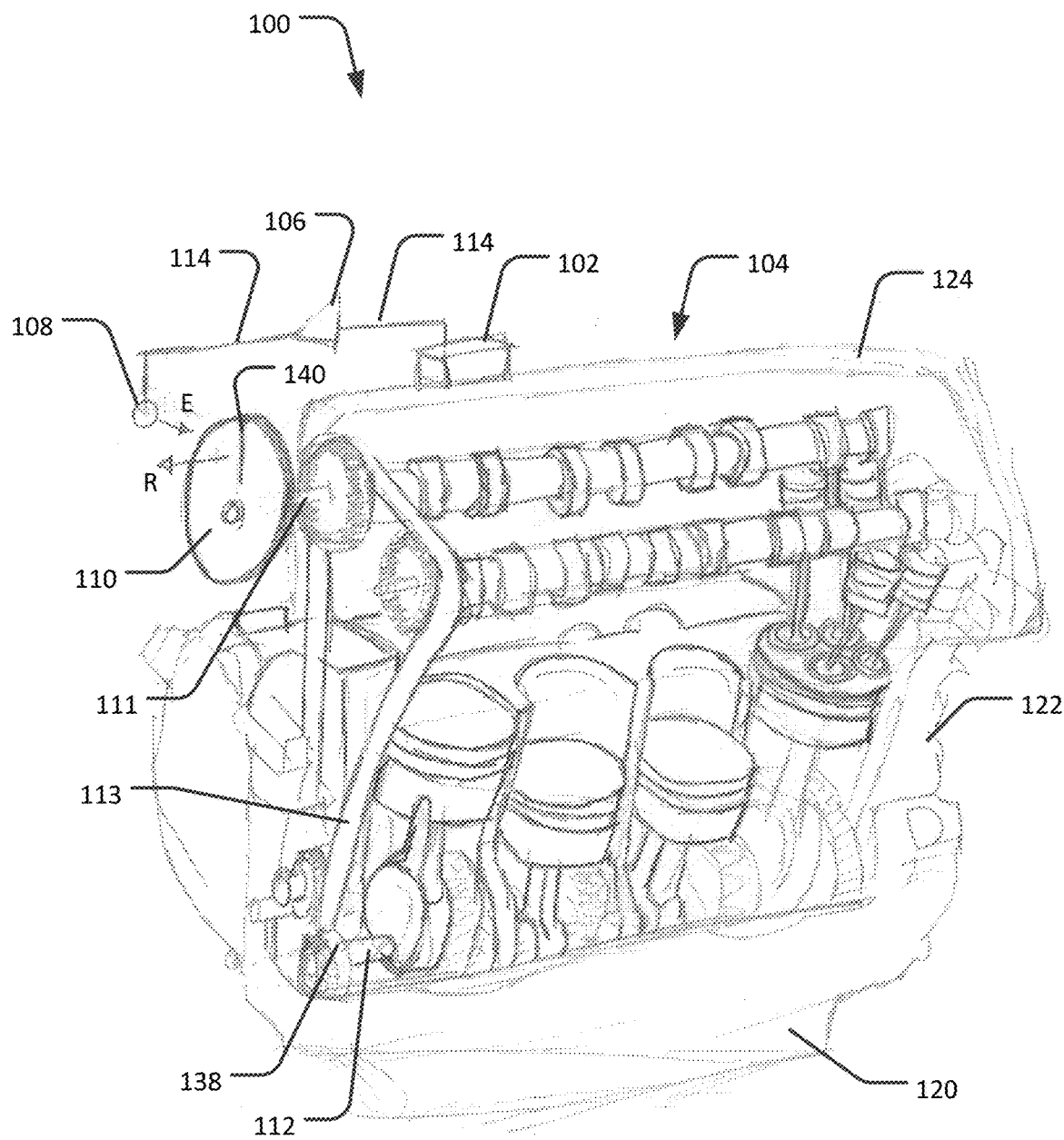
FIG. 2 illustrates a schematic of an embodiment of the engine vibration imager mounted on an engine. For clarity, only one set of valves are illustrated on one piston head.

An embodiment of the engine vibration imager for detecting vibration is illustrated in FIG. 2. The engine vibration imager 100 preferably includes an accelerometer 102, which is mounted to an engine block 104, and measures the engine vibration. The accelerometer 102 is electrically coupled to an amplifier 106, which in turn is electrically coupled to a light indicator 108. Electrical coupling 114 of the accelerometer 102 to the amplifier 106 and the amplifier 106 to the light indicator 108 is preferably provided by wires, circuit traces, electromagnetic induction or electromagnetic radiation coupling through wireless communication facilitated by wireless communication protocols such as Bluetooth (IEEE 802.15.1), ZigBee (IEEE 802.15.4), ultra-wideband (UWB, IEEE 802.15.3) and Wi-Fi (IEEE 802.11). Light emitted E from the light indicator is visible at an indicator disk 110 and, preferably, reflected R from the indicator disk. However, in alternative embodiments, the light may be emitted from the disk when the light indicator 108 is mounted on the disk 110. The indicator disk 110 is mechanically coupled directly or indirectly to the engine crankshaft 112, which rotates the indicator disk 110. As illustrated in FIG. 2, the indicator disk 110 is mounted to the camshaft 111, which is driven by the crankshaft 112 via pulley or belt 113 and gears 138.

As vibration events occur through the engine cycle, which may be caused by the binding of piston rings or the closing of valves, the accelerometer 102 generates a signal, such as a change in voltage, indicative of detected acceleration caused by the vibration. Preferably, the signal correlates with the acceleration of the vibration, wherein the greater the magnitude of the acceleration, the greater the magnitude of the voltage change and, more preferably, the signal is proportional to the acceleration. The accelerometer may be selected from a capacitive accelerometer, a mechanical accelerometer, or a piezoelectric accelerometer, which provide an output signal proportional to acceleration. The accelerometer also preferably exhibits sensitivity in the frequency range of 20 Hz to 5,000 Hz, including all values and increments therein, such as 1,800 Hz to 2,800 Hz, such as 2,400 Hz. Further, in embodiments, the accelerometer generates a signal indicative of vibration when the detected engine vibration exceeds a selected level or minimum threshold. Preferably, a signal is generated when an acceleration of 1 m/sec$^2$ or greater is detected, including all values and ranges therein, such as in the range of 1 m/sec$^2$ to 2,000 m/sec$^2$, and preferably in the range of 2 m/sec$^2$ to 25 m/sec$^2$.

The accelerometer 102 may be affixed to the engine block 104 in various locations. Preferably, the accelerometer is positioned on the crankshaft case 120; however, it may also be positioned on the cylinder block 122 or on the cylinder head 124 as illustrated in FIG. 2. Further, the accelerometer may be affixed to the engine block using an adhesive, such as adhesive cement. Alternatively, or additionally, a mechanical fastener may be used, including threaded configurations, wherein threads are formed in a bore in the accelerometer, and mating threads are provided on a stud extending from the engine block, or vice versa.

The signal generated by the accelerometer is electrically communicated to the amplifier 106 via the electrical coupling 114. The amplifier 106 amplifies or strengthens the signal to a voltage sufficient to power the light indicator 108. Preferably, the amplifier 106 amplifies the output voltage, i.e., the signal indicative of the detected vibration, from the accelerometer 102 to a level that is sufficient to cause the light indicator 108 to emit light. In embodiments, the greater the magnitude of the acceleration and the greater the magnitude of the change in voltage (i.e., the greater the amplification of the signal), and the more power is provided to the light indicator to emit more light. The amplifier 106 preferably amplifies signals in the range of 20 Hz to 20,000 Hz. Further, the amplifier is preferably a linear, voltage amplifier. The amplifier may exhibit a gain, or a ratio of output voltage $V_O$ to input voltage $V_I$ ($V_O/V_I$), in the range of 5 pC/V (picoCharge per Volt) to 500 pC/V, including all values and ranges therein, and preferably 100 to 300 pC/V, and in particular embodiments 200 pC/V (picoCharge per Volt).

It is also noted that amplifier selection affects the ability to obtain an easily interpreted visual result. It is preferable that an amplifier is used, such as an audio amplifier, which allows control of gain, tone, and overdrive/clipping. Control of the gain allows adjustment of the amplification of the signal and amount of lumens emitted, tone control allows filtering to remove noise including higher frequency signal components that are superfluous, and overdrive allows clipping of the signal to boost or compresses closely occurring signals due to structural inconsistencies as well as relatively finer signals and may increase the pulse duration of the emitted light.

The amplified signal is then transmitted via the electrical coupling 114 to the light indicator 108. When the amplified signal is received by the light indicator 108, the light indicator emits light from one or more light emitters. The light emitters preferably emit light in pulses of microseconds or less than microseconds in duration, such as in the range of $10^{-8}$ to $10^{-6}$ seconds. Preferably, the magnitude of acceleration is indicated by the brightness of the light indicator 108. The brightness may be characterized by its luminous flux, which is understood herein as a measure of the perceived power of the emitted light, measured in lumens. In one embodiment, the light emitted is proportional to the output voltage of the amplifier, i.e., the amplified signal indicative of detected vibration. The number of lumens is preferably proportionally altered by increasing or decreasing the lumens emitted by a single light emitter or, when more than one light emitter is present, by altering the number of light emitters that are lit. Alternatively, the light emitted need not be proportional in brightness to the magnitude of the detected acceleration and the luminous flux may remain constant regardless of the magnitude of the vibration. The light emitters are preferably selected from one or a plurality of light emitting diodes or LEDs.

Figure 3:
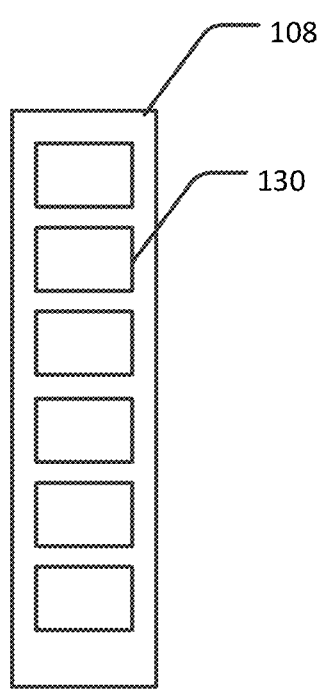
FIG. 3 illustrates a schematic of an embodiment of a light indicator including a plurality of light emitters.

As noted above, the light indicator 108 may include one light emitter as illustrated in FIG. 2 or multiple light emitters 130 as illustrated in FIG. 3. Multiple light emitters 130 are illustrated as being arranged in a column, however other configurations may be assumed as well, such as arranging the light emitters in a circle. In the case of multiple light emitters, as illustrated in FIG. 3, the greater the acceleration detected, the more light emitters are lit. In one embodiment, one lit light emitter correlates to the minimum detected acceleration at which the accelerometer will generate a signal. Additional light emitters may then be lit indicating greater magnitudes of detected acceleration, due to a higher amplified signal until an upper voltage limit is reached where all of the light emitters are lit. It should be appreciated, however, that the amplified signal indicative of detected vibration may exceed the upper limit required to light all of the light emitters. In such a situation, the maximum output of the amplifier may be capped and only the amount of voltage necessary to power the light emitters is directed to the light indicator. Alternatively, or additionally, multiple light emitter colors may be used to indicate the magnitude of the detected vibration.

Preferably, the light indicator emits enough light to be detectable, but not so much light that glancing or looking at the indicator causes discomfort. The light emitters may individually, or in sum, emit from 0.1 lumens to 200 lumens, including all values and ranges therein. More preferably, the light emitters, in sum, emit from 0.1 to 100 lumens. The light emitters preferably emit light in one or more visible wavelengths, such as in the range of 380 nm to 800 nm, including all values and ranges therein, such as 420 nm to 680 nm.

Referring again to FIG. 2, light emitted from the light indicator is visible at the indicator disk 110. As noted above, the indicator disk is coupled to, and rotated by, the crankshaft 112 either directly or indirectly. If indirectly coupled to the crankshaft, the indicator disk is preferably coupled mechanically to the crankshaft through gears 138, pulleys or belts 113; although, electrical coupling is also envisioned. In embodiments, the indicator disk is coupled to the crankshaft using one or more gears in a gear box 138 to reduce or increase the rotational rate, or rotations per second, of the indicator disk to a rate that is lower or higher than of the rate of rotation of the crankshaft. As illustrated in FIG. 2, the light indicator is mounted on the camshaft 111 and indirectly coupled to the crankshaft 112. While the indicator disk 110 is illustrated as being circular, the disk may take on other geometric forms, such as octagonal, hexagonal, square, etc.

In preferred embodiments, the indicator disk rotates once per combustion cycle. To achieve a single rotation per combustion cycle, in a 2-cycle engine, the rate of rotation of the crankshaft 112 (Rc), is the same as the rate of rotation of the indicator disk 110 (Rd) providing a ratio of the rate of crankshaft rotation to rate of indicator disk rotation ($R_C/R_D$) of 1. In the case of a 4-cycle engine, the rate of rotation of the indicator disk 110 (Rd) is half of the rate of rotation of the crankshaft 112 (Rc), providing a ratio of the rate of crankshaft rotation to rate of indicator disk rotation ($R_C/R_D$) of 2, to reduce the rotational speed of the indicator disk by half providing one rotation of the indicator disk per combustion cycle. Alternatively, the indicator disk may rotate a number of times per combustion cycle or less than once per combustion cycle. Thus, the ratio of the rate of crankshaft rotation to rate of indicator disk rotation ($R_C/R_D$) may be in the range of 0.25 to 4, including all values and ranges therein.

Figure 4:
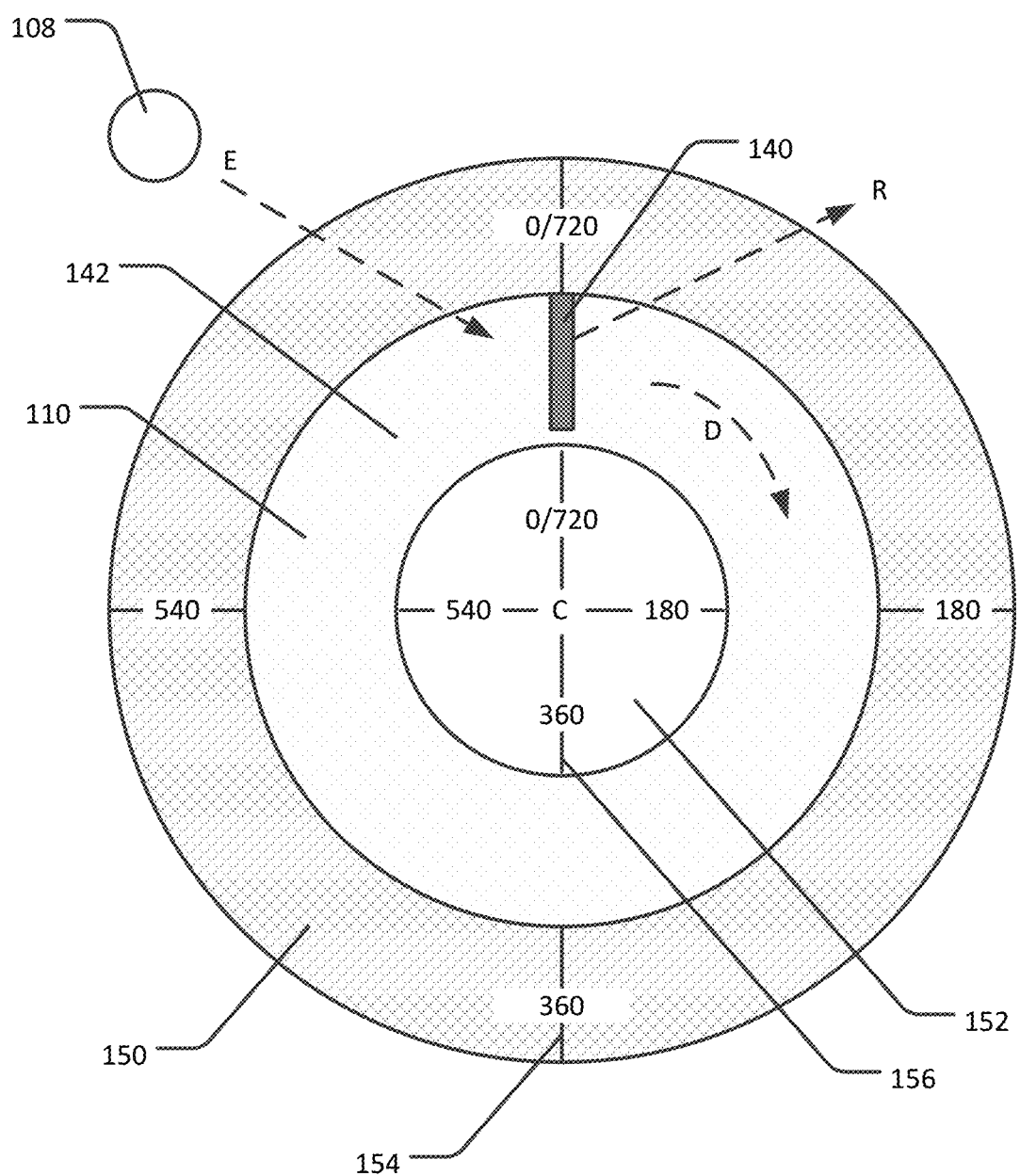
FIG. 4 illustrates a schematic of an embodiment of an indicator disk.

The indicator disk 110 preferably includes a reflective timing mark 140, an example of which is illustrated in FIG. 4, on a surface 142 of the disk. The reflective timing mark may be formed by applying a reflective ink, or other reflective material, onto the surface of the indicator disk. The embodiment of the indicator disk illustrated in FIG. 4 makes a single rotation per combustion cycle in a four cylinder engine. Thus, the indicator disk rotates 180 degrees for each 360 degrees of rotation of the crankshaft and the crankshaft rotates 2 times each combustion cycle. The timing mark 140 is preferably located at or near the periphery of the indicator disk as illustrated; however, it should be appreciated that the timing mark may extend out from, or to, the center of the timing disk. As the disk rotates, the timing mark rotates with the disk around the center C of the disk. The angular location of the timing mark relative to a given reference point (such as represented by the reference mark indicating 0 degrees in FIG. 4) indicates a point (or given moment) in the combustion cycle. In the example provided in FIG. 4, 0 represents when the crank angle is at 0 degrees for the number 1 piston is top dead center at the end and beginning of the combustion cycle. However, it may be appreciated that other reference points, crank angles or reference pistons may be selected. Further, in preferred embodiments, the indicator disk is a dark color, such as black, and the timing mark is a lighter color, such as white or neon yellow. The reflective mark may also, or alternatively, include reflective pigments or additives.

Figure 5A:
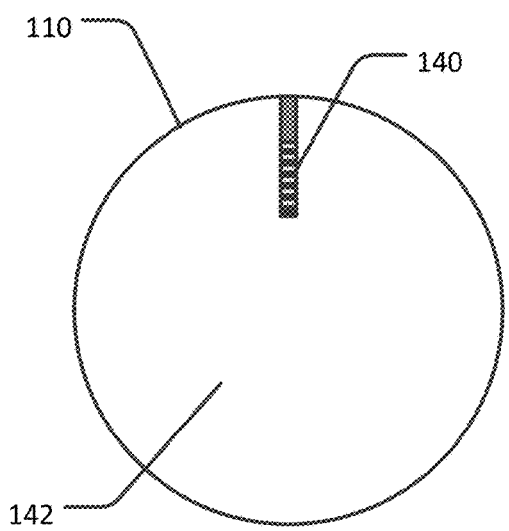
FIGS. 5a through 5d illustrate the rotation of an indicator disk and the movement of the timing mark with the indicator disk.
Figure 5B:
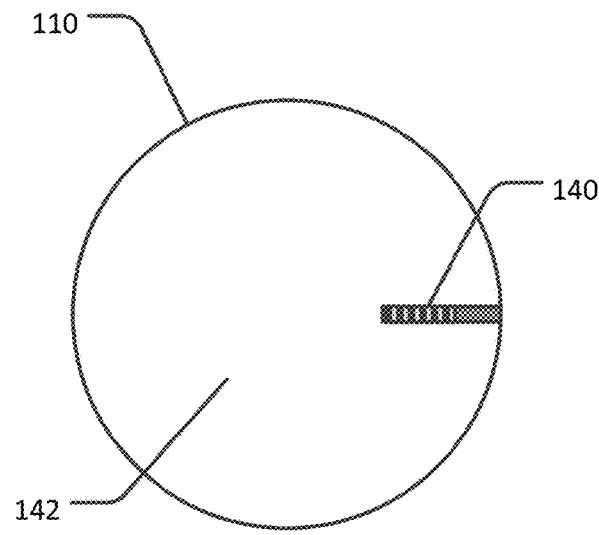
Figure 5C:
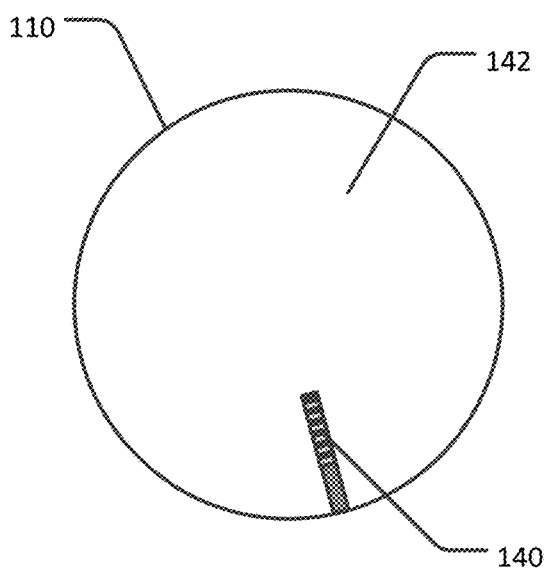
Figure 5D:
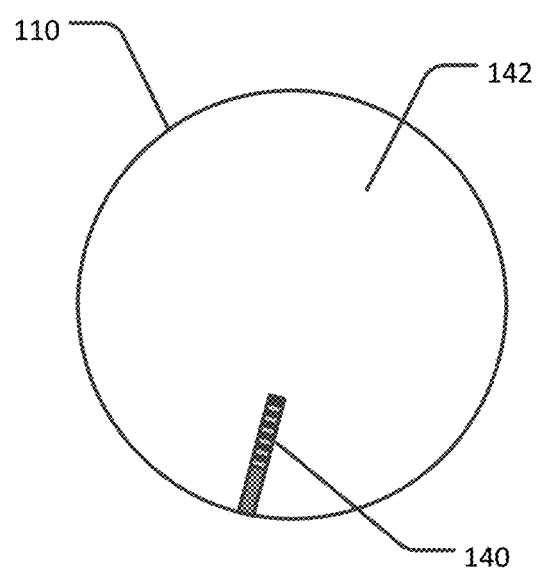

FIGS. 5a through 5d illustrate the illumination of the timing mark at various points in the combustion cycle for a four-stroke engine where the indicator disk rotates at half the rate of the crankshaft and only once per combustion cycle. As seen in FIG. 5a, the timing mark 140 is positioned at 0 or 720 degrees when the piston hits top dead center and the exhaust valve closes after the exhaust gases produced by combustion are expelled from the combustion chamber. The closing of the exhaust valves may cause a vibration that illuminates the timing mark. FIG. 5b illustrates the timing mark 140 at approximately 180 degrees of crank angle, which may correspond to vibration caused by the inlet valve closure after a fuel-air mixture is introduced into the combustion chamber and the piston is approaching bottom dead center. Piston ring dynamics may also cause vibration as the piston approaches and moves away from top dead center near a crankshaft angle of 360 degrees where ignition of the fuel-air mixture occurs (FIG. 5c) and as the flame propagates through the fuel-air mixture (FIG. 5d). It may be appreciated that such piston ring dynamics may appears at other points in the combustion process. Further, as noted above, other incidents may cause vibration, such as events causing engine instability. Flashes may, therefore, occur at various angles relative to a fixed point, not just the four illustrated in FIGS. 5a-5d.

When the light emitter is triggered by the sensing of vibration, the light is reflected off the timing mark, illuminating the timing mark. In alternative embodiments noted below, the light indicator is affixed to the disk. The location of the timing mark relative to the reference point indicates where in the combustion cycle vibration occurs. Given that an engine may turn the crankshaft hundreds and thousands of rotations per minute, repetitive vibration will cause the light indicator to repetitively illuminate each second at the point in the cycle where vibration events occur. Persistence of vision may provide the illusion of an illuminated line (or lines) at the point in the combustion cycle (or points) where vibration occurs.

Also as illustrated in FIG. 4, one or more reference surfaces 150, 152 may be provided. In preferred embodiments, the indicator disk (and the timing mark) rotates relative to the reference surfaces, which remain stationary. Reference marks 154, 156 are provided on the reference surfaces proximal to the indicator disk to aid the observer at determining when in the combustion cycle vibration is occurring. Preferably, the reference marks 154, 156 may be viewed concurrently with the timing mark 140 to assist in determining at what point in the combustion cycle vibration occurs.

The reference marks 154, 156 may be indicative of the cycle phase (i.e., the crankshaft angle). For example, the reference surfaces of FIG. 4 are marked from 0 degrees to 720 degrees of crankshaft angle. In other embodiments, such as in a two-stroke cycle, the references surfaces are marked from 0 to 360 degrees. The degrees may be marked at a number of increments such as 10 degree increments, 30 degree increments, 45 degree increments, 90 degree increments or 180 degree increments. Or, instead of marking the reference surfaces with the crankshaft angle, the reference surfaces may be marked with combustion cycle events such as "start of compression", "ignition", "inlet valve closing", "exhaust valve opening", etc. Depending on the direction of rotation of the crankshaft, the reference marks may increase in the clockwise or counterclockwise direction. As noted above, the location of the reference marks may be calibrated to the cylinder that ignition timing is based on, such as the #1 cylinder. It is also noted that the indicator disk may, in embodiments, assume a shape other than a circle, and may be elliptical, teardrop, square, triangular, or rectangular in shape.

As the indicator disk is rotated around center point C, such as in the direction represented by arrow D, the timing mark is shifted relative to a reference point, such as the reference marks. When a vibration is detected, the light indicator illuminates the indicator disk at or between the reference marks, which indicates when or at what crankshaft angle vibration is detected in the combustion cycle. Thus, if vibration is detected near a crankshaft angle of 360 degrees, in the example above, the indicator disk having been rotated by the crankshaft 180 degrees from the reference point, is illuminated.

Figure 6:
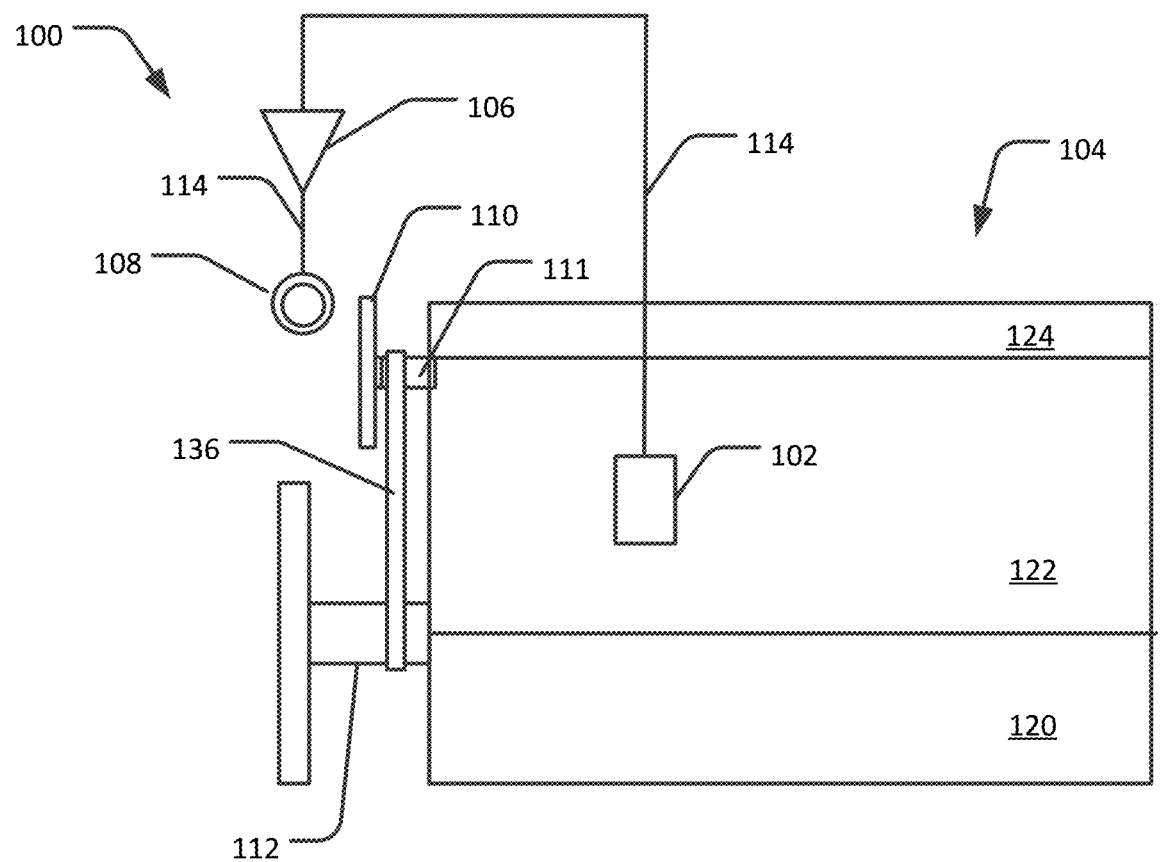
FIG. 6 illustrates a schematic of an embodiment of an indicator disk wherein the indicator light is provided near the center of the disk.
Figure 7:
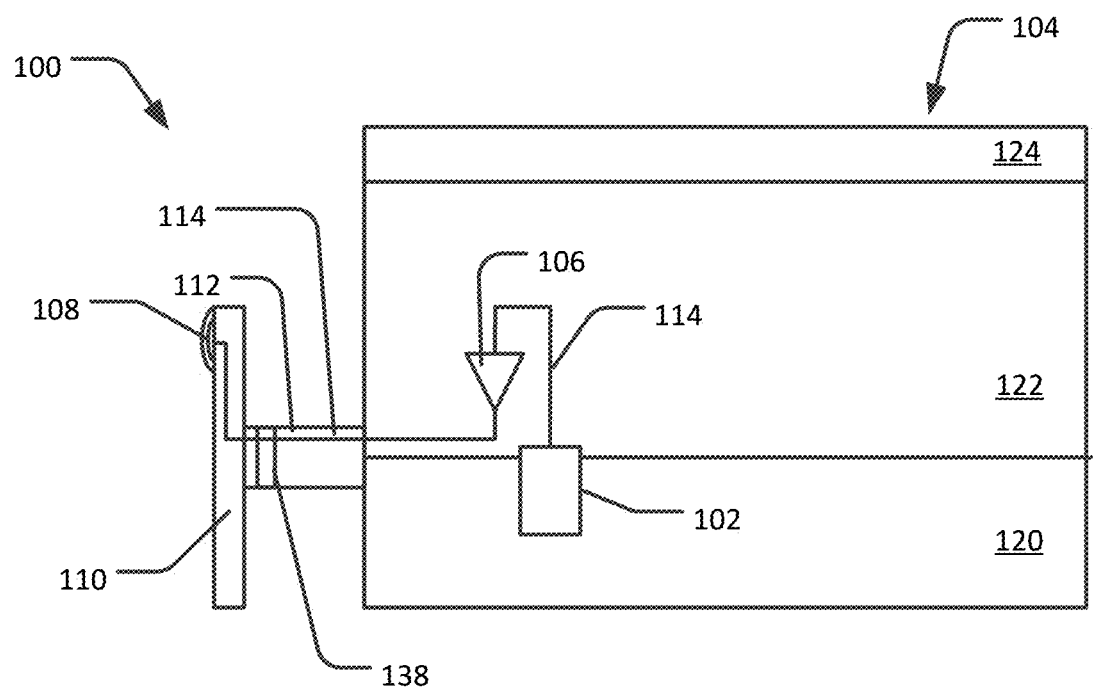
FIG. 7 illustrates a schematic of an embodiment of a light indicator positioned on the indicator disk.
Figure 8:
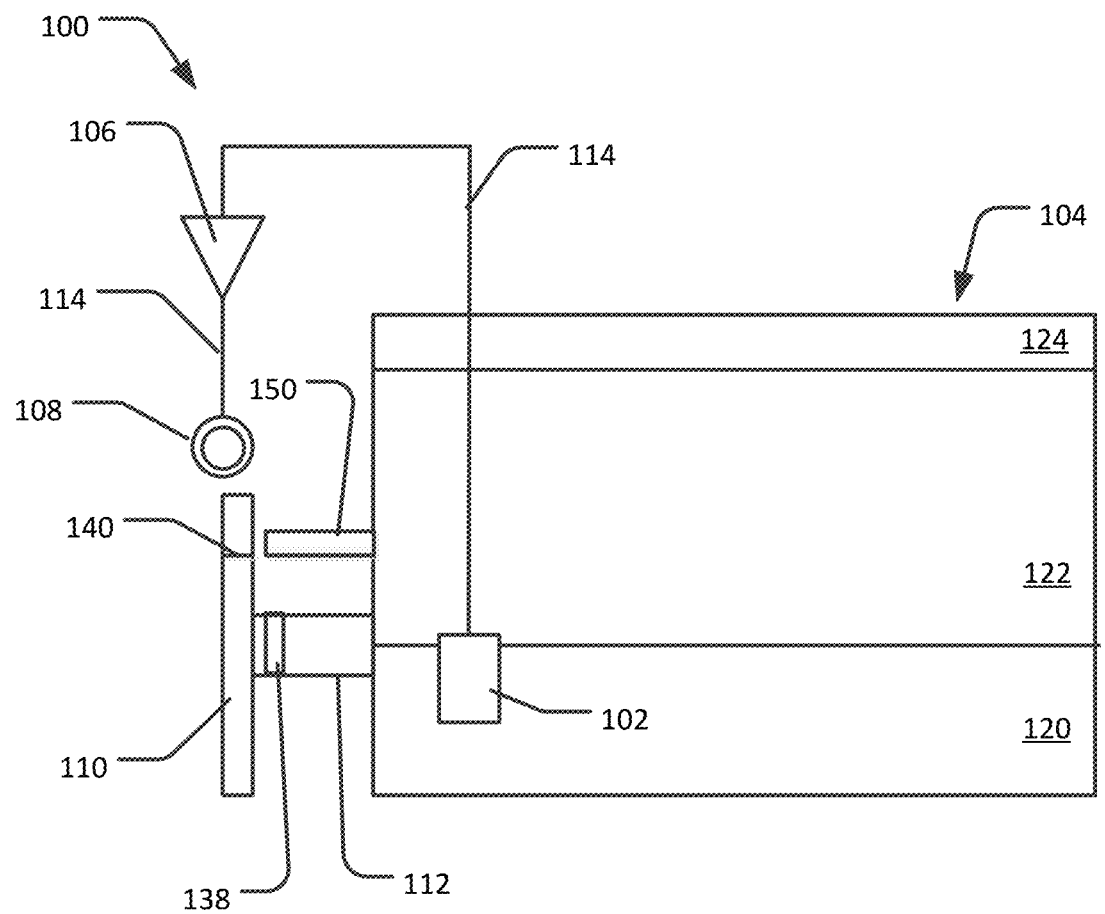
FIG. 8 illustrates a schematic of an embodiment of a light indicator positioned outside of the periphery of the indicator disk.

In embodiments as illustrated in FIG. 2, the light indicator 108 is located in front of the indicator disk 110 proximal to the periphery of the disk. Alternatively, the light indicator 108 may be located in front of and near the center of the indicator disk 110 as illustrated in FIG. 6. FIG. 6 also illustrates the indicator disk mounted to the cam shaft 111. In other embodiments, the light indicator 108 may be mounted onto the indicator disk 110 as illustrated in FIG. 7 providing an illuminated timing mark. FIG. 7 also illustrates the indicator disk mounted directly to the crankshaft 112, and therefore, the disk rotates twice in a four-stroke combustion cycle. FIG. 8 illustrates another configuration where the timing mark 140 is located on the peripheral edge of the disk. In this embodiment, a reference surface including one or more reference marks may be positioned proximal to the periphery of the disk, such that both the timing mark and the reference mark(s) are concurrently visible. In such an embodiment, it may be useful to provide multiple lights around the periphery of the disk as it may be desirable to illuminate the timing mark at various locations around the periphery of the disk. Further, it is noted that in FIG. 8, the indicator disk 110 is mounted to the crankshaft via gear box 138 to slow down the rotation of indicator disk rotation. In any of the above embodiments, depending on the type of light emitting source, extraneous light may be blocked using a shroud to assist in timing mark identification.

In embodiments of the above, other components or properties of vibration, such as velocity and displacement, may be estimated or derived from the detected acceleration. To visualize these other components of vibration, the acceleration signal may be divided by a proportional factor of measurement frequency to visualize velocity, and to visualize displacement the acceleration signal may be divided by a factor proportional to the square of frequency. These computations may be performed by a microprocessor electrically coupled between the accelerometer and the amplifier or between the amplifier and light indicator. The microprocessor may then provide a signal that is indicative of the velocity or displacement, the magnitude of which is then visualized on the light indicator.

In further embodiments of the above, the signal indicative of detected vibration is provided to a microprocessor that is located in an engine control unit, or an onboard controller, and electrically coupled to the accelerometer. The engine control unit microprocessor may then utilize the signal, or a plurality of signals generated by the accelerometer and information provided by a rotary encoder operatively coupled to the crankshaft, to adjust the speed or load at which the engine is operating to reduce the engine vibration. Alternatively, or additionally, the signal indicative of detected vibration may be provided to a data acquisition system that is electrically coupled to the accelerometer. The data acquisition system may be configured to store the signals generated by the accelerometer. Further, using a rotatory encoder operatively coupled to the crankshaft, the data acquisition system may correlate crankshaft angle with the vibration data to determine where vibrations are occurring during the combustion cycle. Further data, such as engine speed and engine load may also be recorded and correlated with the vibration data and crankshaft angle.

Regardless, it may be appreciated that the device allows for visual detection of the vibration while the engine is running without the need for further processing or the use of digital recording. The components of the engine vibration imager may comprise, consist essentially of, or consist of the accelerometer, the indicator disk, the amplifier, the light indictor and electrical connections between the components, in addition to any mechanical components used to affix the device to the engine. Such mechanical components include, for example the accelerometer mounting, the indicator disk mount to mount the disk to the crankshaft, and the optical mount to mount the light emitting source behind the disk.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. An engine vibration imager, comprising:
an accelerometer configured to detect engine vibration;
an amplifier electrically coupled to said accelerometer;
a light indicator comprising at least one light emitter electrically coupled to said amplifier; and
an indicator disk comprising a rotatable indicator and a stationary reference;
wherein the rotatable indicator is rotatable about an axis and comprises a first surface comprising a timing mark and a peripheral surface;
wherein the stationary reference is disposed around the peripheral surface and comprises a reference mark;
wherein said at least one light emitter emits light when said accelerometer detects said engine vibration; and
wherein, when light emitted from said at least one light emitter is visible at said timing mark, a position of said timing mark relative to said reference mark indicates a point in a combustion cycle at which said engine vibration is detected.

2. The engine vibration imager of claim 1, wherein:
said accelerometer is configured to mount to an engine block of an engine and said indicator disk is configured to couple to a crankshaft of said engine, such that in operation, rotation of said crankshaft causes rotation of said rotatable indicator about said axis, while said stationary reference surface remains stationary.

3. The engine vibration imager of claim 2, wherein said crankshaft is configured to rotate at a first rate and said rotatable indicator is configured to rotate at a second rate, wherein said first rate and second rate are the same.

4. The engine vibration imager of claim 2, wherein said indicator disk is configured to mount to a camshaft that is driven by said crankshaft.

5. The engine vibration imager of claim 2, wherein said crankshaft is configured to rotate at a first rate and said rotatable indicator is configured to rotate at a second rate that is less than said first rate.

6. The engine vibration imager of claim 1, wherein light emitted by one or more of said at least one light emitter, a luminous intensity of light emitted by one or more of said at least one light emitter, or a combination thereof is indicative of an acceleration associated with a detected vibration.

7. The engine vibration imager of claim 1, wherein said light indicator is positioned on said first surface of said rotatable indicator and provides said timing mark.

8. The engine vibration imager of claim 1, wherein said amplifier is electrically coupled with said accelerometer and said light indicator through conductive wires.

9. The engine vibration imager of claim 1, wherein said amplifier amplifies signals in the range of 20 Hz to 20,000 Hz and exhibits a gain in the range of 5 pC/V to 500 pC/V.

10. The engine vibration imager of claim 1, wherein said stationary reference is disposed radially around said peripheral surface.

11. The engine vibration imager of claim 10, wherein said reference mark indicates a crankshaft angle.

12. An engine vibration imager, comprising:
an engine including an engine block and a rotatable crankshaft;
an accelerometer mounted to said engine block, wherein said accelerometer is configured to detect engine vibration and to generate a signal indicative of said engine vibration;
an amplifier electrically coupled to said accelerometer, wherein said amplifier is configured to amplify said signal providing an amplified signal indicative of said engine vibration;
a light indicator comprising at least one light emitter electrically coupled to said amplifier, wherein said at least one light emitter is configured to emit light upon receiving said amplified signal; and
an indicator disk comprising a rotatable indicator and a stationary reference;
wherein the rotatable indicator comprises a first surface including a timing mark and a peripheral surface;
wherein the stationary reference is disposed around the peripheral surface and comprises a reference mark;
wherein said rotatable indicator is rotatable by said crankshaft such that light emitted from said at least one light emitter is visible at said timing mark when said accelerometer detects said engine vibration; and
wherein, when light emitted by said at least one light emitter is visible at said timing mark, a position of said timing mark relative to said reference mark indicates a point in a combustion cycle of said engine at which said engine vibration is detected.

13. A method of testing engine stability, comprising:
operating an engine at a speed and a load, wherein said engine includes an engine block and a rotating crankshaft;
detecting engine vibration with an accelerometer mounted to said engine block, wherein said accelerometer generates a signal indicative of a detected vibration;
amplifying said signal with an amplifier electrically coupled to said accelerometer to provide an amplified signal;
rotating a rotatable indicator of an indictor disk about an axis with said crankshaft relative to a stationary reference of the indicator disk, wherein the rotatable indicator comprises a first surface comprising a timing mark and a peripheral surface, and the stationary reference is disposed around the peripheral surface and comprises a reference mark; and
emitting light from at least one light emitter of a light indicator that is electrically coupled to said amplifier upon receiving said amplified signal such that said light emitted by said at least one light emitter is visible at said timing mark, wherein, when light emitted by said at least one light emitter is visible at said timing mark, a position of said timing mark relative to said reference mark indicates a point in a combustion cycle of said engine at which said engine vibration is detected.

14. The method of claim 13, further comprising adjusting one or more of said speed and said load.

15. The method of claim 13, further comprising communicating said signal indicative of a detected vibration or said amplified signal to an engine controller.

16. The method of claim 13, wherein said light indicator is located on said first surface and provides said timing mark.

17. The method of claim 13, wherein said crankshaft rotates at a first rate, Rc, and said rotatable indicator rotates at a second rate, Rd, wherein the ratio of Rc/Rd is in the range of 0.25 to 4.

18. The method of claim 13, wherein said crankshaft rotates at a first rate, Rc, and said rotatable indicator rotates at a second rate, Rd, wherein the ratio of Rc/Rd is in the range of 0.5.

19. The method of claim 13, wherein stationary reference includes at least one reference mark and is disposed radially around said peripheral surface.

20. The engine vibration manager of claim 12, wherein said light indicator is positioned on said first surface of said rotatable indicator and provides said timing mark.

21. An engine vibration imager, comprising:
an accelerometer;
an amplifier electrically coupled to said accelerometer;
a light indicator comprising at least one light emitter electrically coupled to said amplifier; and
an indicator disk comprising a rotatable indicator and a stationary reference;
wherein the rotatable indicator is rotatable about an axis and comprises a first surface comprising a timing mark and a peripheral surface;
wherein the stationary reference is disposed around the peripheral surface;
wherein emitted light from said at least one light emitter is visible at said timing mark; and
wherein the at least one light emitter comprises a plurality of light emitters, and an illuminated number of said plurality of light emitters is indicative of an acceleration associated with a detected vibration.

22. An engine vibration imager, comprising:
an engine including an engine block and a rotatable crankshaft;
an accelerometer mounted to said engine block, wherein said accelerometer is configured to detect engine vibration and to generate a signal indicative of said engine vibration;
an amplifier electrically coupled to said accelerometer wherein said amplifier is configured to amplify said signal providing an amplified signal indicative of said engine vibration;
a light indicator comprising at least one light emitter electrically coupled to said amplifier, wherein said at least one light emitter is configured to emit light upon receiving said amplified signal; and
an indicator disk comprising a rotatable indicator and a stationary reference;
wherein the rotatable indicator comprises a first surface including a timing mark and a peripheral surface;
wherein the stationary reference is disposed around the peripheral surface;
wherein said rotatable indicator is rotatable by said crankshaft such that light emitted from said at least one light emitter is visible at said timing mark; and
wherein the at least one light emitter comprises a plurality of light emitters, and an illuminated number of said plurality of light emitters is indicative of an acceleration associated with a detected vibration.

23. A method of testing engine stability, comprising:
operating an engine at a speed and a load, wherein said engine includes an engine block and a rotating crankshaft;
detecting engine vibration with an accelerometer mounted to said engine block, wherein said accelerometer generates a signal indicative of a detected vibration;
amplifying said signal with an amplifier electrically coupled to said accelerometer to provide an amplified signal;
rotating a rotatable indicator of an indictor disk about an axis with said crankshaft relative to a stationary reference of the indicator disk, wherein the rotatable indicator comprises a first surface comprising a timing mark and a peripheral surface, and the stationary reference is disposed around the peripheral surface; and
emitting light from at least one light emitter of a light indicator that is electrically coupled to said amplifier upon receiving said amplified signal and illuminating said timing mark with said emitted light; and
wherein the at least one light emitter comprises a plurality of light emitters, and illuminating a number of said plurality of light emitters, wherein an illuminated number of said plurality of light emitters is indicative of an acceleration associated with a detected vibration.

24. The engine vibration imager of claim 12, wherein light emitted by one or more of said at least one light emitter, a luminous intensity of light emitted by one or more of said at least one light emitter, or a combination thereof is indicative of an acceleration associated with a detected vibration.

25. The method of claim 13, wherein light emitted by one or more of said at least one light emitter, a luminous intensity of light emitted by one or more of said at least one light emitter, or a combination thereof is indicative of an acceleration associated with a detected vibration.

* * * * *